(12) United States Patent
Sato

(10) Patent No.: US 8,083,419 B2
(45) Date of Patent: Dec. 27, 2011

(54) OPTICAL MODULE WITH AN OPTICAL DEVICE ELECTRICALLY ISOLATED FROM A SLEEVE SHELL

(75) Inventor: Shunsuke Sato, Yokohama (JP)

(73) Assignee: Sumitomo Electric Industries Ltd., Osaka-shi (JP)

( * ) Notice: Subject to any disclaimer, the term of this patent is extended or adjusted under 35 U.S.C. 154(b) by 0 days.

(21) Appl. No.: 12/651,621

(22) Filed: Jan. 4, 2010

(65) Prior Publication Data
US 2010/0172617 A1    Jul. 8, 2010

(30) Foreign Application Priority Data

Jan. 8, 2009 (JP) .................. 2009-002488

(51) Int. Cl.
*G02B 6/36* (2006.01)
(52) U.S. Cl. .......................... 385/92; 385/88
(58) Field of Classification Search ............. 385/92–94
See application file for complete search history.

(56) References Cited

U.S. PATENT DOCUMENTS

| | | |
|---|---|---|
| 7,217,042 B2 | 5/2007 | Okada et al. |
| 2006/0056781 A1* | 3/2006 | Okada et al. ............ 385/93 |
| 2007/0274643 A1* | 11/2007 | Okada ............... 385/88 |

FOREIGN PATENT DOCUMENTS

| | | | |
|---|---|---|---|
| JP | 2006-119577 A | | 5/2006 |
| JP | 2006119577 A | * | 5/2006 |

OTHER PUBLICATIONS

Machine Translation of JP 2006-119577A (Tanake, Tsuyoshi) May 2006.*

* cited by examiner

*Primary Examiner* — Michelle R Connelly Cushwa
(74) *Attorney, Agent, or Firm* — Venable LLP; Michael A. Sartori; Leigh D. Thelen

(57) ABSTRACT

An optical module has disclosed, in which the optical module electrically isolates the optical device from the sleeve shell with a simple and a cost-effective arrangement. The optical receptacle includes the metal holder to hold the stub, the insulating bush to press-fit the holder, and the metal shell to press-fit the bush. The bush electrically isolates the holder from the shell, and has a length press-fitted to the shell overlapping with a length press-fitted to the holder.

7 Claims, 4 Drawing Sheets

Fig. 4A *(Prior Art)*
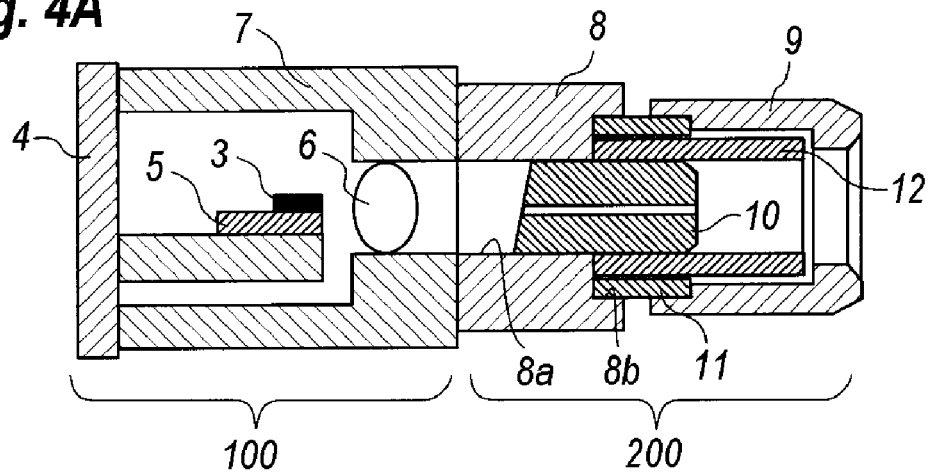
Fig. 4B *(Prior Art)*
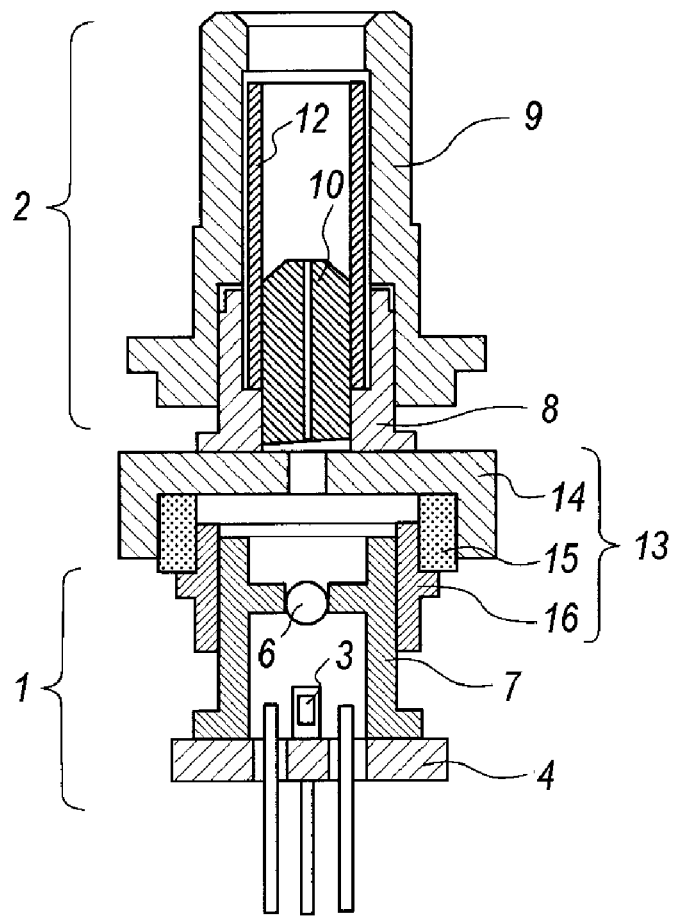

OPTICAL MODULE WITH AN OPTICAL DEVICE ELECTRICALLY ISOLATED FROM A SLEEVE SHELL

BACKGROUND OF THE INVENTION

1. Field of the Invention

The present invention relates to an optical module that provides an optical device installing a semiconductor optical device and an optical receptacle for receiving an optical ferrule provided in an end of an external optical fiber.

2. Related Prior Art

An optical module applicable to the optical communication system generally comprises an optical device that installs a semiconductor light-emitting device, typically a laser diode (hereafter denoted as LD), or a semiconductor light-receiving device such as photodiode (hereafter denoted as PD), and an optical receptacle to receive an optical ferrule provided in the end of the external fiber to align the optical ferrule optically with the LD or the PD in the optical device.

As the operational frequency of the optical module mentioned above becomes higher, an electro-magnetic interference (EMI) due to the LD or the PD in the optical device may be easily emitted from the optical device. The external EMI noise due to the system installing the optical device, typically an optical transceiver, may also easily invade into the optical device. The optical receptacle combined with the optical device generally has a metal body to shield the optical device when the optical module is set in the system.

A Japanese Patent Application published as JP-2006-119577A, has disclosed one type of an optical module, which is illustrated in FIG. 4A, where an optical unit 100 that installs a semiconductor device 3 such as LD and an optical receptacle 200 that receives an external optical fiber. In the optical module shown in FIG. 4A, the insulating spacer 11 set into a spot 8b of the stub holder 8 and also into a bore of the sleeve cover 9 electrically isolates the metal stab holder 8 coming in contact with the optical device 100 from metal sleeve cover 9 to be contact with an external optical connector.

A United States patent, U.S. Pat. No. 7,217,042 has disclosed another optical module whose arrangement is schematically illustrated in FIG. 4B. In this optical module, an insulating cylindrical ring 15 set between the upper and lower metal rings, 14 and 16, to isolate the optical device 1 electrically from the optical receptacle 2.

The prior optical modules shown in FIGS. 4A and 4B electrically isolate the optical device that installs an LD or a PD from the optical receptacle for receiving the external optical connector. This arrangement may shield the optical device from the external radiation noise and may protect the optical device from an external surge. However, the arrangement to isolate the optical device from the outside appeared in these prior arts have a complex structure. In the former prior art, the spacer 11 which is set between the stub holder 8 and the sleeve cover 9 always receives a compressive stress from both members. While, in the other prior art, the insulating ring 15 and two metal rings, 14 and 16, put the insulating ring 15 therebetween are press-fitted to each other; that is, the insulating ring 15 is press-fitted into the upper ring, the lower ring 16 is press-fitted into the insulating ring 15, then the optical device 7 is welded with the lower ring 16 and the bush in the sleeve member 2 is welded with the upper ring 14. Moreover, the latter arrangement appeared in the U.S. Pat. No. 7,217,042 has an essential restriction that the insulating ring 15 is necessary to be formed in thin.

The present invention is to provide an optical module that may electrically isolate the optical device from the optical receptacle by a simple arrangement, accordingly, to provide a cost-effective optical module.

SUMMARY OF THE INVENTION

An optical module of the present invention provides an optical device that installs a semiconductor optical device such as an LD and a PD, and an optical receptacle that receives an external optical fiber to be optically coupled with the semiconductor optical device. The optical module of the present invention has a feature that it comprises a sleeve to receive an optical ferrule provided in an end of the optical fiber; a stub set within the sleeve in a closer portion to the optical device; a holder, which is made of electrically conductive material, to hold the stub directly in a closer portion to the optical device; a bush made of electrically insulating material and receiving the holder therein; and a shell that covers the sleeve, the stub, the holder and the bush, being made of electrically conductive material. The bush of the invention electrically isolates the holder from the shell.

In the present invention, the holder is press-fitted with the bush, while, the bush is press-fitted with the shell such that the holder and the bush are overlapped with a first length; and the bush and the shell are overlapped with a second length. Moreover, the overlapped portion of the first length overlaps with the overlapped portion of the second length. Thus, the bush receives an expanding stress from the holder, while, the bush receives a compressive stress from the shell, which reliably holds the bush between the holder and the shell.

BRIEF DESCRIPTION OF THE DRAWINGS

The foregoing and other purposes, aspects and advantages will be better understood from the following detailed description of a preferred embodiment of the invention with reference to the drawings, in which:

FIG. 4A schematically shows a first conventional arrangement of the optical module that electrically isolates the optical device from the optical receptacle, and FIG. 4B shows a second conventional arrangement of the optical module.

DESCRIPTION OF PREFERRED EMBODIMENTS

Figure 1:
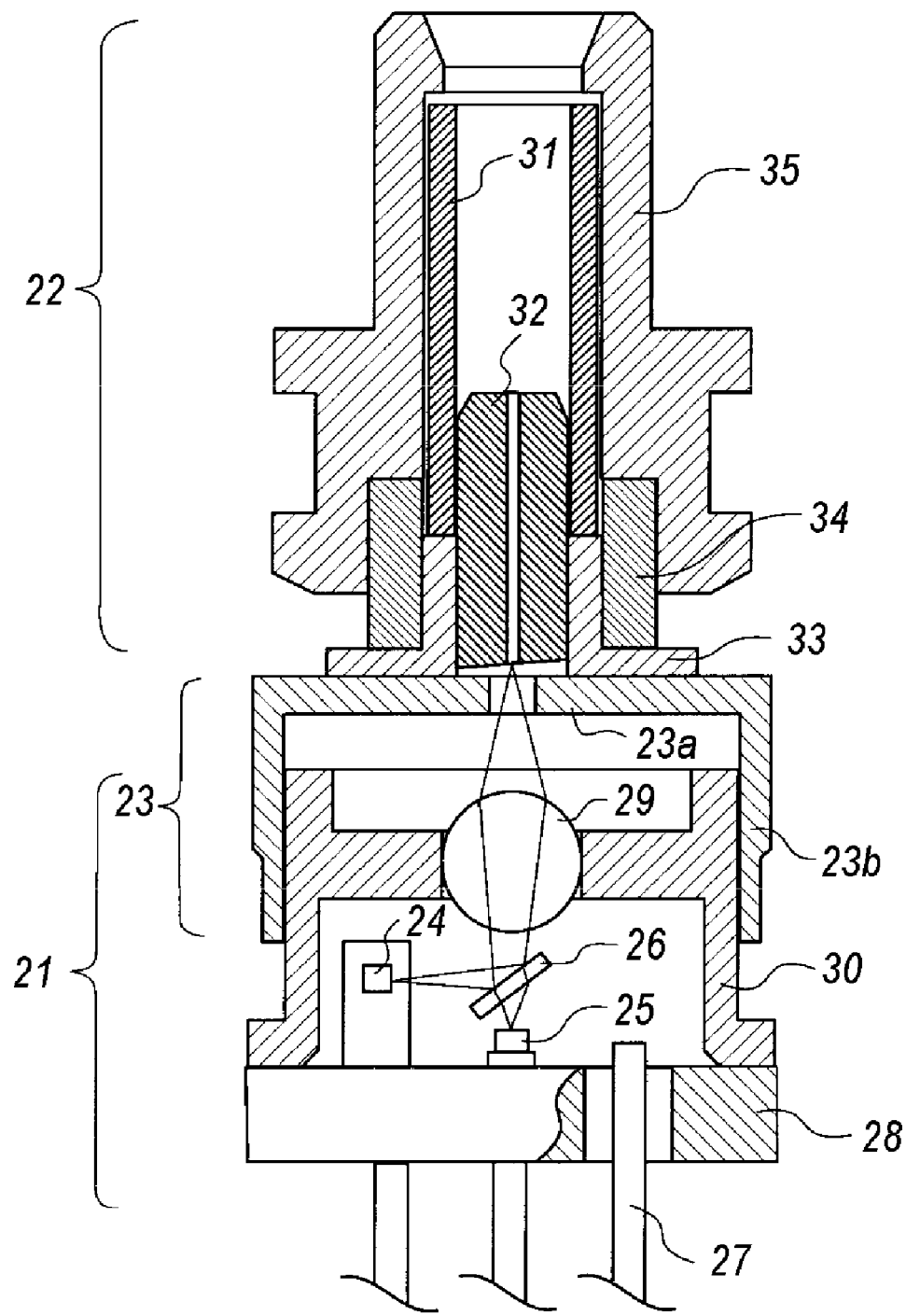
FIG. 1 is a cross section of the optical module according to an embodiment of the present invention.

Next, preferred embodiments according to the present invention will be described as referring to accompanying drawings. FIG. 1 shows an exemplary drawing of an optical module according to the present invention. The optical module shown in FIG. 1 primarily comprises an optical device 21, an optical receptacle 22, and a joint sleeve 23. The joint sleeve 23 has a co-axial shape with a ceiling 23a in one end thereof, while a cylinder 23b is extended from the ceiling 23a. The optical device 21 includes a semiconductor light-emitting device 24, a semiconductor light-receiving device 25, and a wavelength division multiplexing (hereafter denoted as WDM) filter 26. These optical elements are enclosed within a space formed by a stem 28 and a cap 30. The stem 28 and the cap also have the co-axial shape, that is, the stem with a plurality of lead pins 27 has a disk shape and the cap 30 is fixed to a peripheral portion of the stem 28. The cap 30 provides a lens 29 in a ceiling thereof. The optical receptacle 22 includes a sleeve 31, a stub 32, holder 33, an insulating bush 34 and a shell 35.

Figure 2:
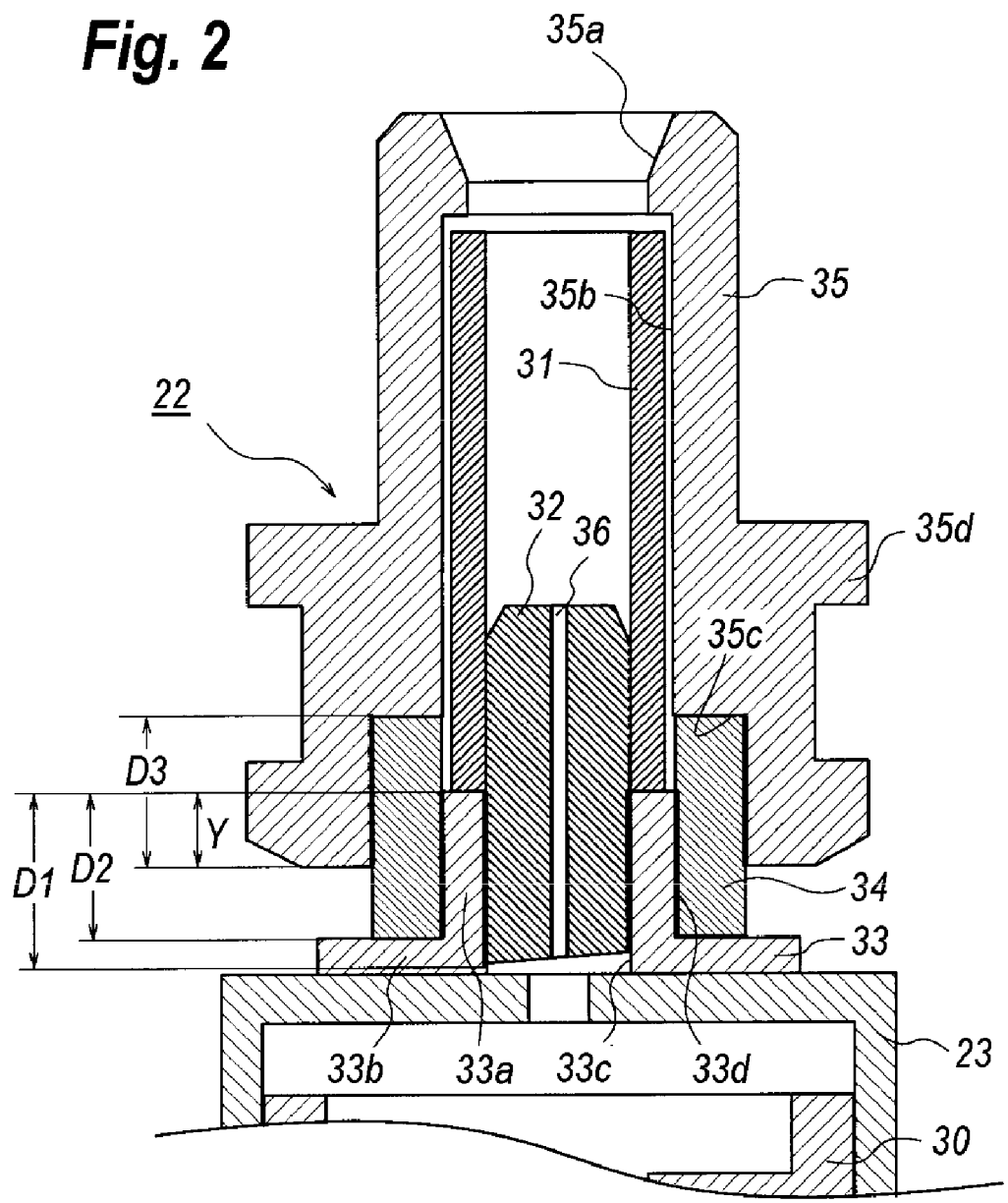
FIG. 2 shows a portion of the optical module shown in FIG. 1 where the bush electrically isolates the metal holder from the metal shell.

FIG. 2 further illustrates the optical receptacle 22. The stub 32, which has a cylindrical shape, provides a coupling fiber 36 in a center portion thereof. The holder 33 also has a co-axial shape with a flange 33b and a cylinder 33a. The cylinder 33a has a bore 33c that continues to an aperture of the flange 33b and an external surface 33d. The shell 35 provides an opening 35a with a chamfered inlet, a first bore 35b into which the sleeve 31 is set, a second bore 35c into which the bush 34 is set, and a flange 35d.

The present embodiment shown in FIG. 1 provides the optical device 21 with the light-emitting device 24, typically a semiconductor laser diode (hereafter denoted as Ld) and the light-receiving device 25, typically a semiconductor photo-diode (hereafter denoted as PD), and the WDM filter 26, which configures a bi-directional optical module to emit first light to the coupling fiber from the LD 24 and concurrently to receive second light from the coupling fiber to the PD 25. However, the present invention may be applicable to a transmitter optical module that only emits light, or to a receiver optical module that only receives light.

In the embodiment shown in FIG. 1, the WDM filter 26, which is set in a position where the optical axis from the LD 24 crosses with the optical axis extending from the PD 25, reflects light with the first wavelength from the LD 24 to the coupling fiber 32, while the WDM filter 26 transmits light with the second wavelength coming from the coupling fiber 32 to the PD 25. The optical device 21 may install other elements on the stem 28 such as a pre-amplifier to amplify an electrical signal generated by the PD 25, a driver circuit to drive the LD 24, or a circuit to match the impedance of the optical device 21 with transmission lines set outside of the optical device 21.

The stem 28 provides the leads 27 assembled so as to be electrically isolated from the stem and to seal the inner space air-tightly. The lens 29 set in a center portion of the ceiling of the cap 30 with an adhesive, such as glass sealant, concentrates the light from the WDM filter on the end of the coupling fiber 32, while, it also concentrates the light from the coupling fiber 32 on the PD 25. The lens 29 also seals the space air-tightly. The cap 30 is, for instance, resistance-welded with the stem 28. In another example, the lens 29 may be replaced with a plate substantially transparent to the light from the LD 24 or from the coupling fiber 32.

Next, details of the optical receptacle 22 will be described. The optical receptacle 22 receives an optical ferrule attached to an optical connector, which is not shown in figures, to couple the external fiber set in the optical ferrule and the LD 24 and the PD 25 in the optical device 21. As illustrated in FIG. 1, the optical receptacle includes the sleeve 31 to receive the optical ferrule, the stub to be abut against the tip of the ferrule set in the sleeve 31, the holder 33 made of metal to hold the stub 32, the insulating bush 34 and the shell 35. In a root portion of the optical receptacle 22 close to the optical device 21, diameters of those members are larger in this order.

The joint sleeve 23, which is made of metal, comprises the ceiling 23a and the cylinder 23b. The ceiling has an aperture to pass the light from the optical device to the coupling fiber 36. The joint sleeve may optically align the optical receptacle 22 with the optical device 21 by sliding the optical device 21 within the cylinder 23b of the joint sleeve 23 along the optical axis, while, the optical alignment in directions perpendicular to the optical axis may be performed by sliding the optical receptacle 22 on a top surface of the ceiling 23a as making the bottom surface of the flange 33b of the holder 33 in contact with the outer surface of the cylinder 23a. Thus, the outer surface of the ceiling 23a is formed in substantially flat. The YAG laser welding may fix the joint sleeve 23 in the cylinder 23b thereof with the cap 30 of the optical device 21 permanently, while in the flange 33b of the holder 33 with the ceiling 23a of the joint sleeve 23 permanently.

The sleeve 31 of the optical receptacle 22 may be made of ceramics, such as zirconia, with a slit along the axis thereof, which is often called as the split sleeve. The sleeve 31 aligns the optical ferrule secured in the tip of the external fiber and makes the insertion into or the extraction from the sleeve 31 facilitated. The sleeve 31 may hold the sub 32 in one end thereof.

The sleeve 31 may be a type of the rigid sleeve without any slit along the axis thereof. The rigid sleeve has accurate physical dimensions especially in an inner diameter thereof to align the ferrule set within the bore of the sleeve 31 precisely. The stub 32 may be also made of ceramics such as zirconia, and provides an end surface close to the optical device 21 inclined to the optical axis. This inclined end surface may effectively reduce the reflection of the light coming from the optical device and also prevent the light reflected thereat from entering the LD 24 again. An antireflection coating on the surface of the stub but not inclined with the optical axis may bring the substantially same result.

The stub 32 is held by the holder 33 by the press-fitting of a portion close to the optical device into the holder 33. The holder 33, as already described, comprises the cylinder 33a and the flange 33b. The stub 32 is press-fitted in the portion closer to the optical device 21 into the bore 33c of the holder 33. Thus, the stub 32 is secured by the holder 33 in a range D1.

The holder 33 is press-fitted in the cylinder 33a thereof into the bush 35. That is, the outer surface 33d of the cylinder 33a comes in contact with the inner surface of the bush 34. The bush may be also made of ceramics such as zirconia, and may have a longitudinal length greater than a range D2, which is the length of the outer surface 33d of the cylinder 33a. The bush 34 in the end surface thereof abuts against the flange 33b of the holder 34, which may align the bush 34 with respect to the holder 33. Thus, the bush 34 receives a stress so as to expand axially.

The bush 34 is press-fitted into the second bore 35c of the shell 35. The shell 35, as already described, provides the opening 35a into which the optical ferrule is inserted, the first bore 35b that receives the sleeve 31, the second bore 35c that receives the bush 34, and the flange 35d in an outer periphery thereof to assemble the optical receptacle 22 in another optical component such as optical transceiver. Between the sleeve 31 and the first bore 35b is provided with a gap so as to stir the sleeve 31. The first bore 35b and the second bore 35c forms a step where the top of the bush 34 abut against; thus the shell 35 is positioned with respect to the bush 35. In the arrangement shown in FIG. 2A, the bush 34 receives an axial stress in a range D3 along the optical axis so as to compress inwardly.

Although the present embodiment comes each ends of the bush 34 in contact with the step and the flange, the bush 34, the holder 33 and the shell 35 may have another arrangement where the end of the bush makes a gap with respect to the step between the first and second bores, 35b and 35c, of the shell 35, while, the other end thereof may be apart form the flange 35b of the holder 35. When the three members, 33 to 35, are assembled with each other by the press-fitting, the pressure may become an index of the process conditions, that is, when the tip of the bush 34 comes in contact with the flange 33b of the holder 33, and the other tip of the bush 34 comes in contact with the step between bores, 35b and 35c, the pressure to press-fit the bush abruptly increases. Then, the process may stop the press-fitting by monitoring the pressure.

However, the index of the pressure described above is independent on the dimensional accuracy between the bore of the bush 34 and the outer diameter of the cylinder 33d, and between the outer diameter of the bush 34 and the inner diameter of the second bore 35c. Even when the outer diameter of the cylinder 33d is larger than the diameter of the bore of the bush 34, the pressure to press-fit the bush 34 abruptly increases when the tip of the bush 34 comes in contact with the flange 33b. Thus, the abutting between two members may not directly reflect the securing force for the inner member by the outer member. The design, where the tips of the bush do not operate as the end point of the press-fitting, may bring another index of the process. One of the indices is to monitor the maximum pressure during the press-fitting, which may directly reflect the holding strength for the inner member by the outer member.

The bush 34, which is made of insulating material, typically ceramics, is breakable compared to the metal holder 33 and the metal shell 35. However, the bush 34 receives an expanding force from the holder 33 in the range D2 and also receives a compressive stress from the shell 35 in the range D3, and these ranges, D1 and D3, are overlapped in a range Y. Thus, the expanding stress and the compressive stress may be balanced in the overlapped length Y, which may secure the force to hold the holder 33 without thickening the holder 34.

Figure 3:
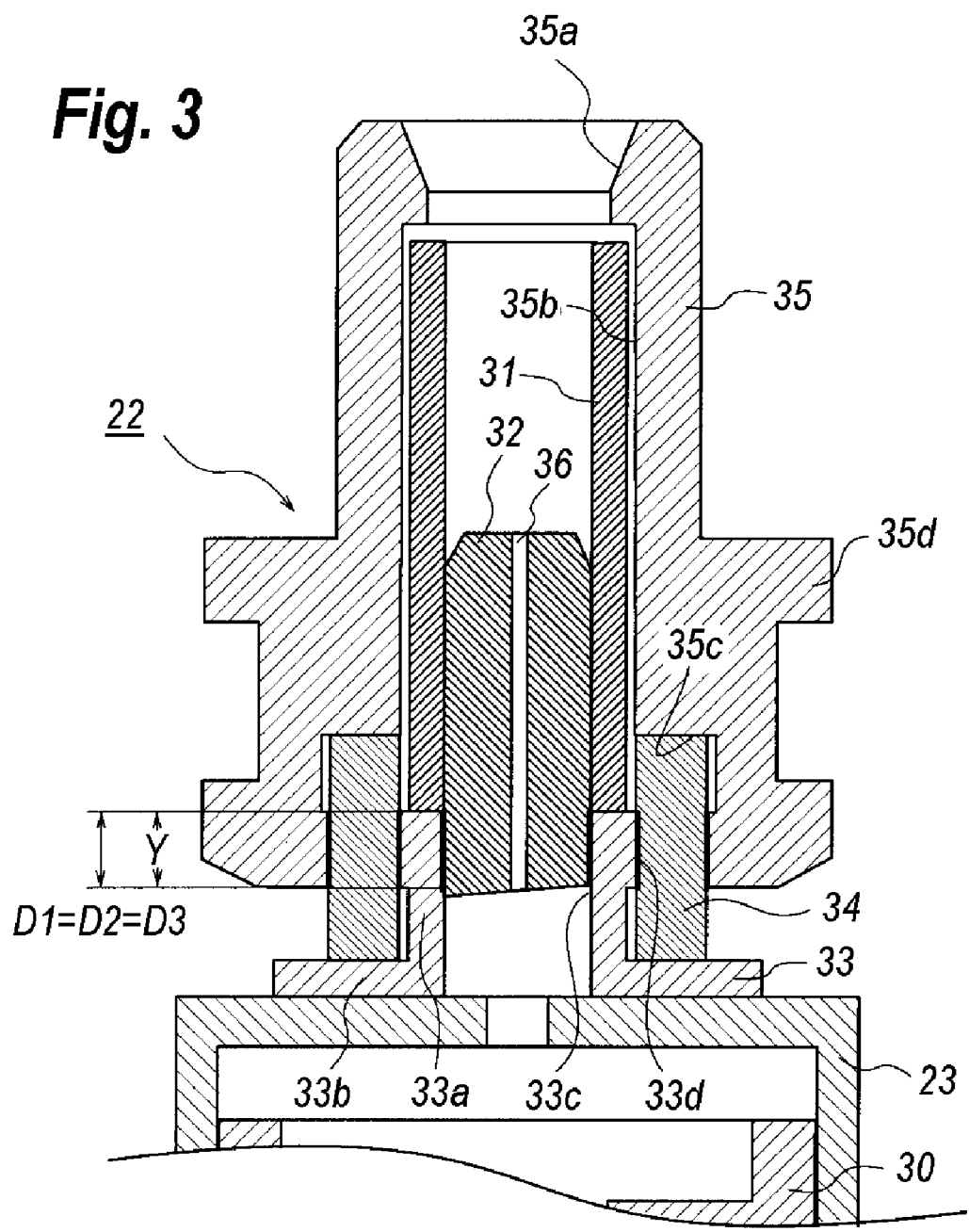
FIG. 3 shows a cross section of the optical module according to the second embodiment of the present invention.

FIG. 3 shows one modification of the embodiment illustrated in FIG. 2, in which a range D1 where the stub 32 comes in contact with the holder 33 overlaps with a range D2 where the holder 33 comes in contact with the bush 34. That is there is a gap between the bush 34 and the holder 33 without the range D2. Moreover, this range D2 overlaps with a range D3 where the bush 34 comes in contact with the shell 35. Thus, the bush 34 may receive the expanding stress from the holder 33 and the compressive stress from the shell 35 in the same range, which may balance both stresses.

Thus, the optical receptacle 22 according to the present embodiment has the arrangement where the metal holder 33, which is connected to the signal ground of the optical device 21, may be electrically isolated from the shell 35, which is connected to the frame ground, by the insulating bush 34. The circuit connected to the optical device 21 may be protected from the external surge noise and the EMI radiation from the circuit may be also reduced. Moreover, the overlap Y between the metal holder 33 and the metal shell 35 may show the shield effect for the noise caused by the optical device 21.

The metallic members, the holder 33 and the shell 35, may be made of stainless, while, the non-metallic member, the bush 34, may be made of zirconia because the expansion co-efficient of the stainless is close to that of the zirconia. Specifically, among the stainless members, that having the expansion co-efficient of 11 ppm/° C. may be fit to the zirconia. The assembly press-fitted to each other sometimes degrades the reliability at lower or higher temperatures because of the difference in the expansion coefficients of two members. Two members with the expansion coefficients substantially equal to or considerably close to each other may enhance the reliability of the press-fitting.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

I claim:

1. An optical module having an optical device that installs a semiconductor optical device therein and an optical receptacle that receives an external optical fiber to be optically coupled with said semiconductor optical device,
    wherein said optical receptacle comprises,
    a sleeve configured to receive an optical ferrule provided in an end of said optical fiber;
    a stub set within said sleeve in a portion close to said optical device;
    a holder to hold said stub directly in a portion close to said optical device, said holder being made of electrically conductive material;
    a bush made of electrically insulating material, said bush receiving said holder; and
    a shell to cover said sleeve, said bush, said holder, and said stub, said shell being made of electrically conductive material,
    wherein said holder is in contact with said bush in a first range along an optical axis; and said bush is in contact with said shell in a second range along said optical axis, said second range overlapping with said first range, and
    wherein said bush electrically isolates said holder from said shell.

2. The optical module of claim 1,
    wherein said holder is press-fitted with said bush, and said bush is press-fitted with said shell.

3. The optical module of claim 1,
    wherein said first range fully overlaps with said second range.

4. The optical module of claim 1,
    wherein said shell has a first bore for receiving said sleeve and a second bore for receiving said bush, and
    wherein said bush has an end abutting against a step formed between said first bore and said second bore of said shell.

5. The optical module of claim 1,
    wherein said holder has a cylinder for receiving said stub and a flange in an end thereof, and
    wherein said bush has an end abutting against said flange of said holder.

6. The optical module of claim 1,
    wherein said holder and said shell are made of stainless steel and said bush is made of zirconia,
    wherein said stainless steel has an expansion coefficient substantially equal to an expansion coefficient of said zirconia.

7. The optical module of claim 1,
    wherein said bush has a flange coming in contact with a joint sleeve provided for coupling said optical receptacle optically with said optical device, and
    wherein said shell abuts against said flange of said bush.

* * * * *